United States Patent [19]

Tleimat

[11] Patent Number: 5,409,576
[45] Date of Patent: Apr. 25, 1995

[54] ROTATING EVAPORATOR DEVICE FOR THE DISTILLATION OR CONCENTRATION OF LIQUIDS

[76] Inventor: Badawi Tleimat, 75 Ina Ct., Alamo, Calif. 94507

[21] Appl. No.: 92,454

[22] Filed: Jul. 16, 1993

[51] Int. Cl.⁶ .......................... B01D 1/22; B01D 1/26; B01D 1/28
[52] U.S. Cl. .................................. 202/174; 202/182; 202/197; 202/236; 202/269; 159/6.3; 159/7; 159/11.1; 159/17.1; 159/17.2; 159/DIG. 42; 203/11; 203/26
[58] Field of Search ............... 202/236, 238, 173, 174, 202/197, 182, 269; 159/11.1, 7, 12, 17.1, 17.2, 13.1, 49, DIG. 42; 203/26, 89, 72, DIG. 22, 10, 11

[56] References Cited

U.S. PATENT DOCUMENTS

| | | | |
|---|---|---|---|
| 1,501,515 | 7/1924 | Testrup | 202/236 |
| 2,894,879 | 7/1959 | Hickman | 202/236 |
| 2,993,842 | 7/1961 | Smith | 202/236 |
| 2,996,439 | 8/1961 | Glover | 202/236 |
| 2,999,796 | 9/1961 | Bromley | 202/236 |
| 3,136,707 | 6/1964 | Hickman | 202/236 |
| 3,282,798 | 11/1966 | Tidball | 202/236 |
| 3,764,483 | 10/1973 | Tleimat | 202/236 |
| 3,890,205 | 6/1975 | Schnitzer | 202/236 |
| 4,504,361 | 3/1985 | Tkac et al. | 202/236 |
| 4,586,985 | 5/1986 | Ciocca et al. | 202/236 |
| 4,707,220 | 11/1987 | Feres | 202/236 |
| 5,045,155 | 9/1991 | Ramsland | 202/236 |

Primary Examiner—Wilbur Bascomb, Jr.

[57] ABSTRACT

A rotating evaporator device is disclosed for the distillation or concentration of liquids. The rotating evaporator device of the present invention utilizes a multiplicity of pairs of disks wherein each disk pair forms a cavity within which heating vapor condenses on the interior surfaces of the disk pair and evaporation occurs from a thin film of distilland deposited on the outside surfaces of the disk pair by means of flexible wipers pressing on the outside surfaces of the disk pair. The centrifugal force created by the rotation of the disks causes the distillate and distilland films to be very thin resulting in very high heat transfer coefficient. The pairs of disks are joined together at the inside peripheries and are rotated about a stationary hollow shaft wherein heating vapor is introduced into the cavities through ports in the shaft and stationary scoops are connected to the shaft to withdraw the condensate from the circumferential peripheries of the cavities. The pairs of disks in combination with the stationary shaft form a rotor assembly which is secured in a sealed chamber where the disks are rotated by a drive shaft extending into the chamber. One or more rotor assemblies can be installed in each chamber together with rotary demisters to prevent distilland droplets from contaminating the generated vapor. A plurality of these chambers together with the other components are contained in a sealed housing configured to operate in multiple effect so that the generated vapor from one effect is used as the heating vapor in the following effect. The combination of these components form a module which can be used in thermally driven multiple effect distillation and or vapor compression distillation.

23 Claims, 8 Drawing Sheets

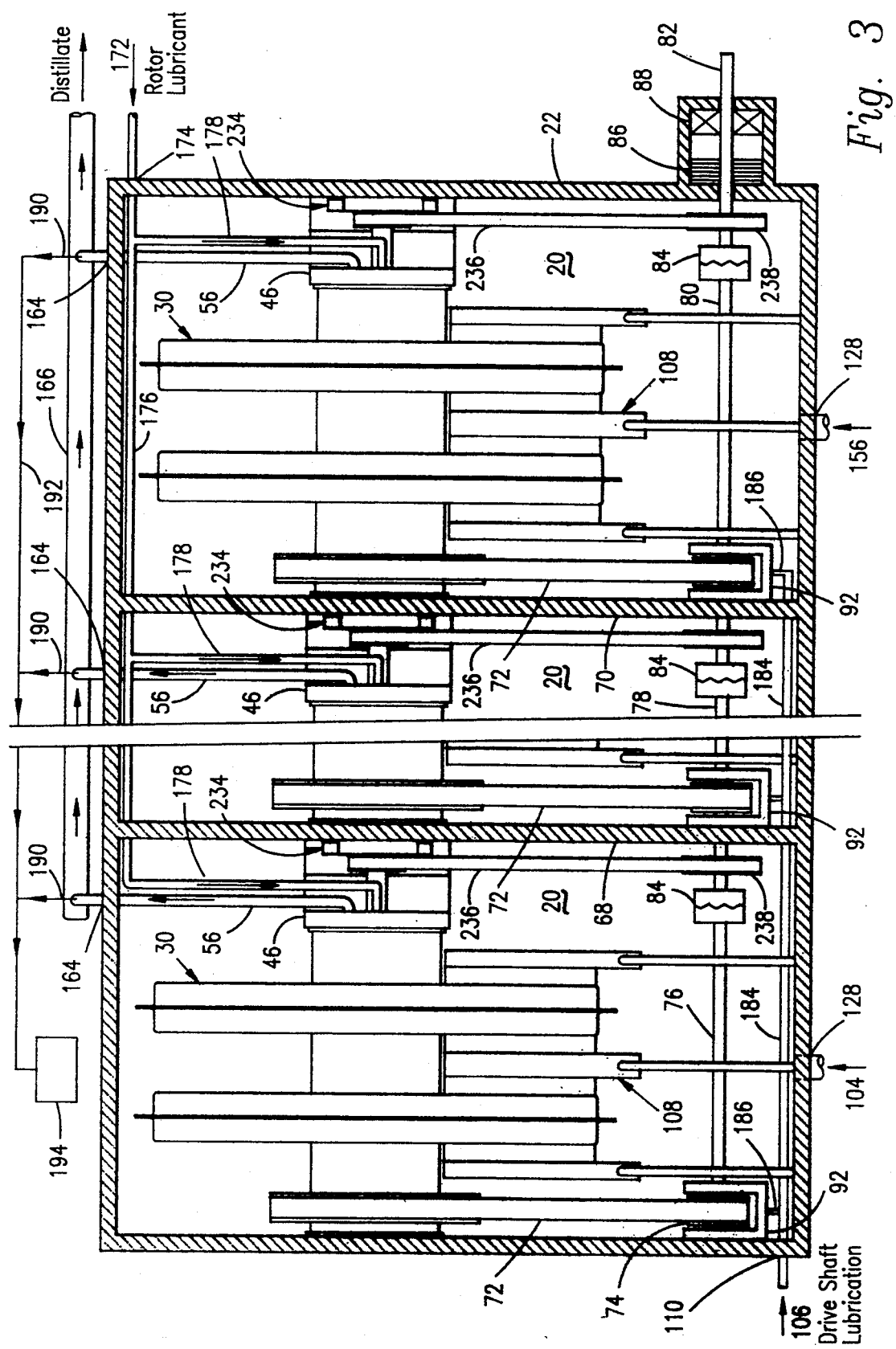

ROTATING EVAPORATOR DEVICE FOR THE DISTILLATION OR CONCENTRATION OF LIQUIDS

BACKGROUND

1. Field of the Invention

This invention relates to new and useful improvements in multieffect wiped film rotating evaporators which can be used in mechanically driven vapor compression distillation and in thermally driven multieffect distillation processes that can be employed in wide varieties of applications such as the desalting of saline waters, the recovery of distilled water from gray and brown waste waters, the concentration of toxic liquid waste, the concentration of milk, the production of alcohol, and other distillation separation processes.

This invention also relates to the use of the module in life support systems for the recovery of distilled water from waste water in partial gravity conditions in isolated environments such as space crafts and future Lunar and Martian colonies.

2. Description of the Prior Art

A wide variety of single and multieffect rotating evaporators are known for accomplishing these goals. For example, U.S. Pat. No. 2,703,310 to Kretchmar (1955) shows a vacuum distillation system which includes rotating flat disks and a series of stationary condensers where the disks dip into a pool of a heated solution and condensation occurs on the outside surface of the condenser tubes resulting in heat transfer factor of the same magnitude as in conventional distillers.

U.S. Pat. No. 2,894,879 to Hickman (1959) shows a multieffect distillation apparatus in which rotating conical disk pairs forming cavities are employed. The feed to be evaporated is sprayed on the inside surfaces of the disk pairs and the heating vapor is condensed on the outside surfaces of the disk pairs, the unevaporated feed collected in the periphery is withdrawn by stationary scoops inside the cavities. Here, dry spots that form on the evaporation side of the disk will prevent the feed from reaching the areas behind the dry spots rendering those portions of the area of the disk ineffective. Also sediments in the feed could deposit in the periphery and clog the scoops.

U.S. Pat. No. 3,764,483 (1973) to Tleimat discloses a single effect rotating disk evaporator in which the rotor consists of rotating disk pairs forming cavities where the feed is spread by means of stationary wipers into a very thin film on the outside surfaces of the disk pairs and the heating vapor condenses on the inside surfaces of the disk pairs. The condensate formed inside the cavities is withdrawn by means of stationary scoops between the disks. Data obtained using seawater feed showed the heat transfer coefficient to be an order of magnitude higher than that in conventional distillation systems (about 5000 compared to 500 Btu/hr ft$^2$ F) with no scale deposition on the disks. However, its use in multieffect distillation systems requires the connection of multiple units in series with its associated problems of heat losses, intereffect leakages, connecting piping, and cost.

U.S. Pat. No. 3,890,205 to Schnitzer (1975) shows an integral vapor compression apparatus in which one or more disks, rotating at high speed, are used as the heat transfer surface between boiling and condensing fluids. This embodiment is susceptible to the formation of dry spots on the evaporation side of the disk and may be limited to small capacity applications.

U.S. Pat. No. 4,504,361 to Tkac et al (1985) shows flat stationary surfaces where the heating medium is applied on one side and the feed to be distilled is spread or scraped on the other side by means of rotating wipers/scrapers. In this embodiment the heat transfer factor would be much lower due to the absence of centrifugal force on the condensation side that is present in rotating disk systems.

U.S. Pat. No. 4,586,985 to Ciocca et al (1986) shows a multieffect still which consists of rotating disks that form chambers in which condensation and evaporation occur. The heating steam enters the first chamber and condenses on the left side of the second disk and saline water enters the second chamber and is deposited on the right side of the second disk where part of it evaporates and the other part is fed to the third chamber. The resulting vapor condenses on the left side of the third disk to evaporate an equivalent amount of saline water feed from the right side of the third disk and so on to the last effect. The resulting vapor from the last effect condenses on the left side of the last disk which is being cooled by saline water on its right side. Again, this embodiment does not prevent the formation of dry spots on the evaporation side and is limited in capacity due to the fact that the heat transfer area per effect is limited to the surface area of each individual disk.

U.S. Pat. No. 4,707,220 to Feres (1987) shows a rotating evaporator consisting of pairs of conical disks connected together inside a drum to form the rotor. In this embodiment, evaporation occurs on the inside surfaces of the disk pairs and condensation of the heating vapor occurs on the outside surfaces of the disk pairs. The feed enters the cavity between the first pair of rotating disks and is spread on its inside surfaces. Evaporation occurs by condensing the heating vapor, from an external source, on the outside surfaces of the disk pairs. The unevaporated portion of the feed at the outside periphery of the cavity is picked up by a stationary scoop located between the disk pair and is fed into the second disk pair where further evaporation occurs. The more concentrated solution is similarly fed into the third disk pair and so on to the last disk pair where the unevaporated portion is taken out as residue. The condensate resulting from the heating vapor is collected on the inside surface of the rotating drum and is picked up by a stationary scoop and taken out as distillate. Again, this embodiment does not prevent the formation of dry spots on the inside surfaces of the disks and sediments present in the feed could cause clogging of the scoops. Its capacity is also limited because the heat transfer area per effect is governed by the surface area of each pair of disks.

OBJECTS AND ADVANTAGES

The present invention eliminates the problems of dry spots, clogging of the scoops, and the limitation on heat transfer surface area per effect. Accordingly, in addition to the advantages of the wipers described in my Pat. No. 3,764,483, my present invention provides a multieffect rotating evaporator module with the following advantages:

(a) It includes several effects in one enclosure to eliminate associated intereffect leaks, heat losses, and piping cost, (b) It can pack large heat transfer area per unit volume in each module, (c) It can be used in the multieffect vapor compression mode,
(d) It allows several modules to be arranged in series for use in thermally driven multieffect distillation,
(e) It can be easily adapted for use in small systems such as the concentration of toxic liquid waste in small plants and laboratories, and in large systems such as the desalting of saline water for the production of fresh drinking water,
(f) It allows large capacity modules to be factory assembled and tested prior to shipment minimizing field assembly and erection, increasing system reliability, and decreasing cost. Still further objects and advantages will become apparent from a consideration of the description and drawings.

BRIEF STATEMENT OF THE INVENTION

The present invention comprises of multiplicity of rotating disk pairs in each effect with several effects housed in one enclosure to form one module. The rotating disk pairs are mounted on a stationary horizontal hollow shaft. Each disk pair forms a cavity within which the heating vapor condenses on the inside surfaces of the disks and the feed evaporates from a thin film wiped on the outside surfaces of the disks. The modules can be arranged in series for thermally driven multieffect distillation systems or be used singly in multieffect vapor compression distillation.

In thermally driven multieffect distillation the feed solution and heating vapor from external sources enter the first effect of the first module. The condensate from the first effect of the first module is returned to the external source. The residue from the last effect of the first module is used as the feed to the second module and the vapor generated in the last effect of the first module is used as the heating vapor in the second module. This process is repeated in several modules. In the last module the residue from the last effect forms the final residue and the vapor generated in the last effect is condensed in a final condenser. The condensate streams from the second effect of the first module through all the other effects of the system together with the condensate stream from the final condenser are collected as distillate.

In multieffect vapor compression distillation, two to several effects, the vapor generated in the last effect of the module is compressed to raise its saturation pressure and temperature and is then used as the heating vapor in the first effect. Because of the gradual increase of dissolved solid concentration in the solution as compared to single effect, this arrangement reduces the anergy input to the compressor per unit of product and greatly reduces the physical size of the compressor. This occurs because the volumetric capacity required by the compressor is inversely proportional to the number of effects.

BRIEF DESCRIPTION OF THE DRAWINGS

FIG. 3 shows a schematic cross section taken along line 1—1 of FIG. 1.

DESCRIPTION OF THE PREFERRED EMBODIMENT

Figure 1:
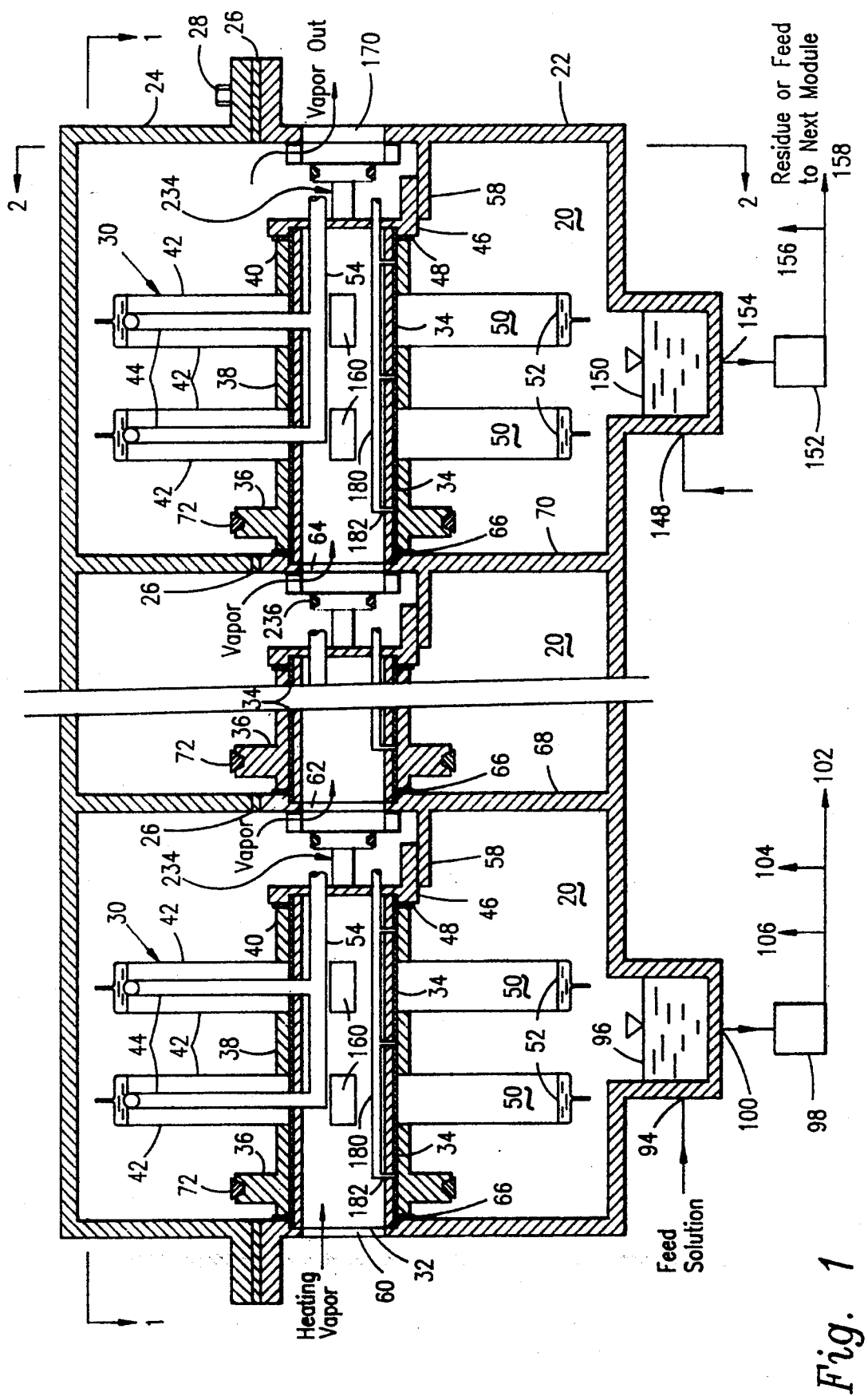
FIG. 1 shows a schematic cross section of the module taken along line 1—1 of FIG. 2.
Figure 2:
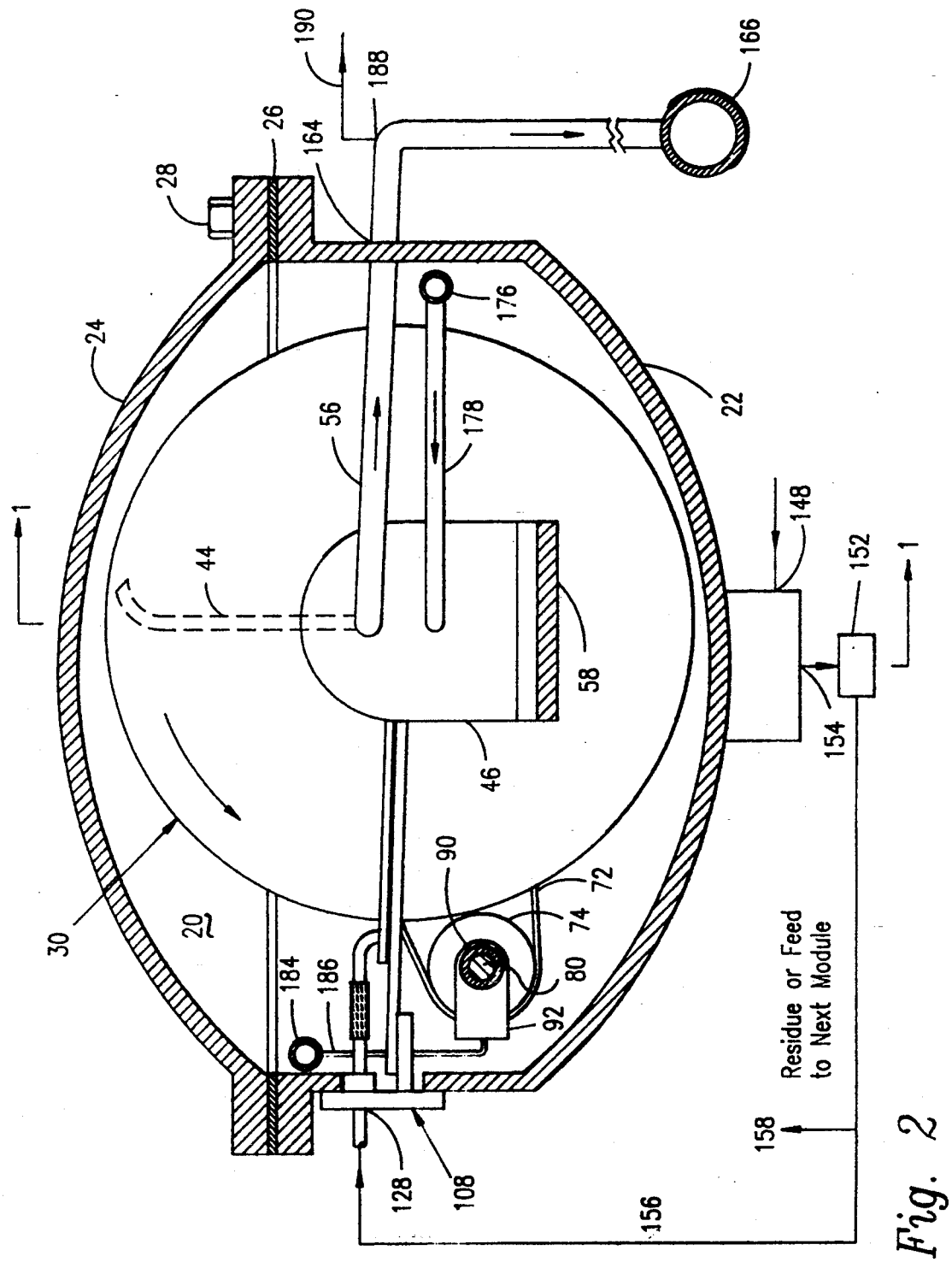
FIG. 2 shows a schematic cross section taken along line 2—2 of FIG. 1.

A typical embodiment of the multieffect rotating evaporator module of the present invention is illustrated in FIGS. 1 through 11. It comprises of a tight enclosure defining separate chambers 20. The enclosure consists of a housing 22 and cover 24 secured together with a gasket 26 and bolts 28. Within each chamber 20 one or more rotor assemblies 30 are installed. Each rotor 30 consists of a horizontal stationary hollow shaft 32, a pulley coupling 36, intermediate couplings 38, an end coupling 40, preformed heat transfer disks 42, distillate scoops 44, a bracket 46 with suitable bearing material 48 attached to bracket 46 which is fastened to shaft 32. In this assembly a bearing insert 34 is attached either to the outside surface of shaft 32 or to the inside surfaces of each of the couplings 36, 38 and 40. In this assembly one disk 42 is attached to pulley coupling 36, one pair of disks 42 is attached to each intermediate coupling 38, and one disk 42 is attached to end coupling 40. The disks 42 are fastened to each other at the outside flanges to form cavities 50 where one stationary scoop 44 per cavity 50 is fastened to shaft 32. The scoops 44, where the condensate is withdrawn from pool 52 communicate with manifold 54 which protrudes through bracket 46 and is suitably attached to tube 56 (FIGS. 2, 3). Each rotor 30 is supported on one side by fastening bracket 46 to shelf 58 and on the other side by partially inserting the end of shaft 32 into vapor inlets 60, 62, and 64 where the end of each coupling 36 butts against bearings 66 which are attached to one end of housing 22 and to separating plates 68 and 70. The assemblies 30 in chambers 20 are rotated by couplings 36 through belts 72 and pulleys 74 which are suitably attached to shafts 76, 78, and 80 (FIG. 3). Shafts 76, 78, 80, and 82 are connected to one another by flexible couplings 84 with drive shaft 82 protruding from housing 22 through suitable seal 86 and bearings 88. The shafts 76, 78, and 80 rotate inside bearing inserts 90 bonded to brackets 92 which, in turn, are fastened to housing 22 and separating plates 68 and 70.

Figure 6:
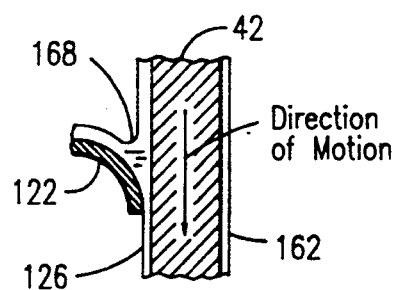
FIG. 6 shows a schematic presentation of the wiper, disk, feed pool, and feed and condensate films.
Figure 4:
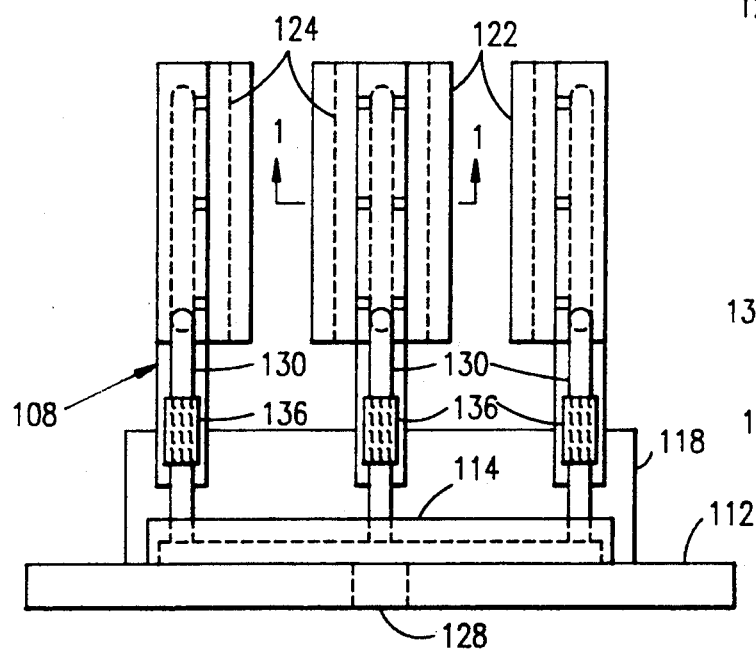
FIG. 4 shows a schematic representation of wiper assembly.
Figure 5:
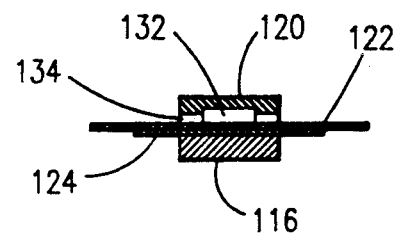
FIG. 5 shows a schematic cross section taken along line 1—1 of FIG. 4.

In operation the feed solution enters the first effect at 94 and mixes with the liquid in pool 96 (FIG. 1). This mixture is withdrawn from pool 96 by pump 98 at 100. The stream from pump 98 is split into three streams 102, 104, and 106. Stream 102 is used as feed to the second effect while stream 104 is circulated back to the first effect through wiper assembly 108. Stream 106 enters the housing 22 at 110 and is used as lubricant for the bearing inserts 90. The assembly 108 (FIGS. 4 and 5)

consists of a plate 112, a feed manifold 114 fastened to plate 112, bottom wiper holders 116 fastened to shelf 118, top wiper holders 120, flexible wipers 122 with suitable springs 124 underneath wiper 122 to push wiper 122 toward disk 42 so that a very thin distilland film 126 is applied on disk 42 (FIG. 6). Both wiper 122 and spring 124 are clamped between lower and upper holders 116 and 120. Here, stream 104 enters assembly 108 at 128, through plate 112, and into manifold 114 where it is distributed through hoses 136 and tubes 130 into channels 132 and out of slots 134 into pool 168 (FIG. 6). The feed is then wiped as a very thin liquid film 126 onto the outside surfaces of rotating disks 42.

Figure 7:
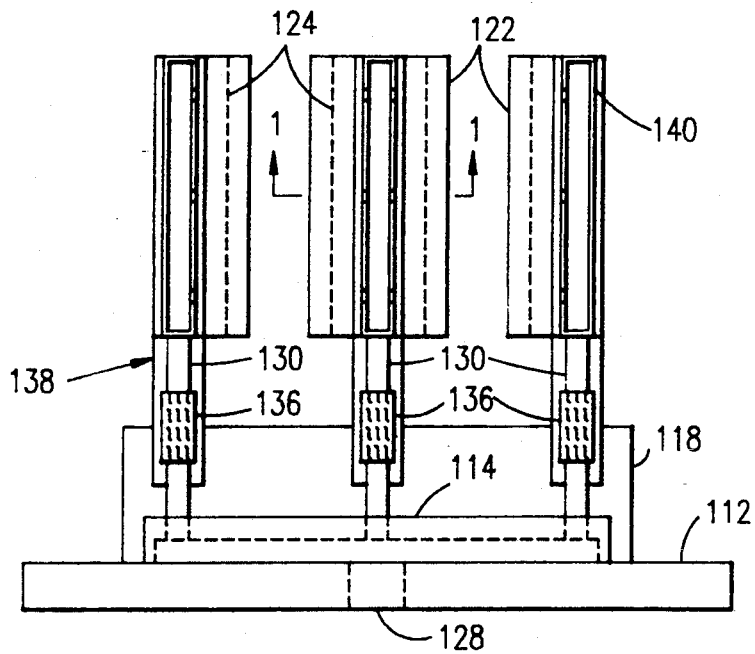
FIG. 7 shows an alternate schematic representation of wiper assembly.
Figure 8:
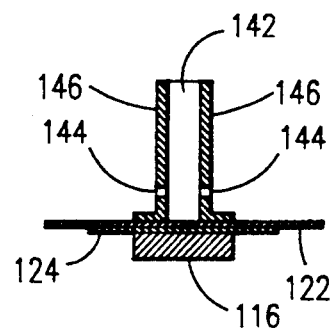
FIG. 8 shows schematic cross section taken along line 1—1 of FIG. 7.

Another alternate wiper assembly 138 is shown in FIGS. 7 and 8. It consists of plate 112 feed manifold 114 fastened to plate 112, bottom wiper holders 116 fastened to shelf 118, top wiper holders 140, flexible wipers 122 with suitable springs 124, both clamped in a similar manner to that in assembly 108. The top wiper holder 140 consists of an open channel 142 with both ends closed but with orifices 144 strategically located in the sides of channel 146. Here, stream 104 enters the alternate assembly 138 in a similar manner to that in assembly 108. However, the feed solution in channel 142 exits through orifices 144 into pool 168 and onto disks 42. The unevaporated feed is slung from the peripheries of disks 42 onto the inside surface of chamber 20 where it drains and mixes with the feed in pool 96 (FIG. 1).

Stream 102 from the first effect enters the second effect and mixes with the liquid pool at the bottom of effect 2. This process is repeated in a similar manner in the other effects except the last effect where the stream from the previous effect enters the last effect at 148 and mixes with the liquid in pool 150. The mixture 150 is withdrawn by pump 152 at 154 and is then split into two streams 156 and 158. Stream 156 is circulated back into the last effect through another wiper assembly 108 in a similar manner to that occurring in the other effects while stream 158 is used as the feed solution to another module or discarded as residue.

Figure 10:
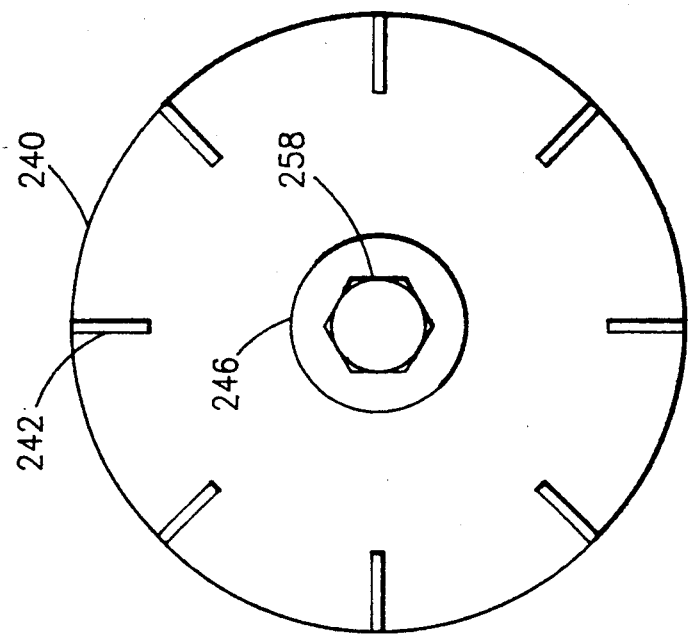
FIG. 10 shows a schematic end view of the demister.
Figure 9:
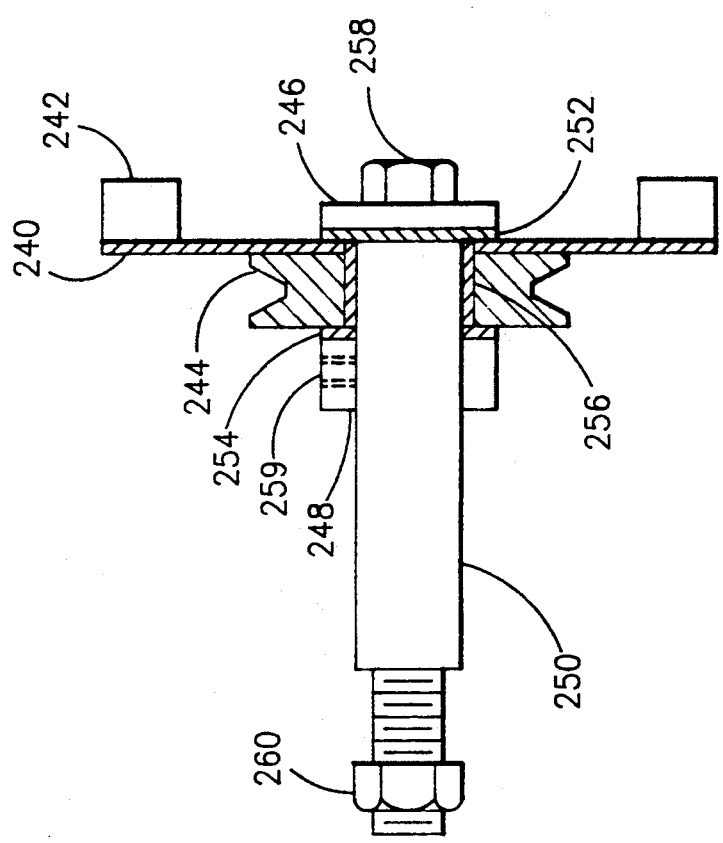
FIG. 9 shows a schematic cross section of the rotary demister assembly.

The heating vapor from an external source (FIG. 1) enters the first effect at inlet 60 into shaft 32. The vapor then enters the cavities 50 through slots 160 in shaft 32 where it condenses as a thin film 162 on the inside surfaces of rotating disks 42 (FIG. 6). Due to centrifugal force the condensate in each cavity 50 is thrown to the periphery to form rotating condensate pools 52 from which the condensate is withdrawn by stationary scoops 44 into internal condensate manifold 54. The condensate then passes through bracket 46 into tube 56, out of module at 164, and into external condensate manifold 166. The manifold 166 is located below point 164 so that a liquid seal is provided between the effects to prevent intereffect vapor leakage. The heat released by the condensing vapor is conducted through film 162, disk 42, and film 126 (FIG. 6). Here, the latent heat of condensation causes the evaporation of an equivalent amount of feed from film 126 (FIG. 6) making it thinner prior to being replenished to its original thickness from feed pool 168. The heating vapor generated in the first effect is used as the heating vapor for the second effect where the vapor enters the rotary demister assembly 234 and then enters the second effect at inlet 62 to repeat the process occurring in the first effect. The vapor generated in the second effect is used as the heating vapor in the third effect and so on to the last effect. The vapor from the last effect is taken out through a demister 234 and out of the module at 170 to be used as the heating vapor to another module or to be condensed in a final condenser. FIGS. 9 and 10 are schematic presentation of the rotary demister assembly 234. It consists of a circular plate 240 with integral paddles 242 and pulley 244 suitably attached to plate 240 with suitable bearing material 256 bonded to the inside diameter of pulley 244 and plate 240. The plate 240 and pulley 244 rotate on a stationary shaft 250 between two stationary collars 246 and 248 with suitable thrust bearing washers 252 and 254 to prevent metal to metal rubbing. Collar 246 is fastened to shaft 250 by bolt 258 and collar 248 is fastened to shaft 250 by set screw 259. Shaft 250 is fastened to bracket 46 by nut 260. Plates 240 and pulleys 244 in each effect are rotated by belts 236 and pulleys 238 which are suitably attached to shafts 78, 80, and 82.

In operation plate 240 is rotated at predetermined speed so that distilland droplets entrained in the vapor are intercepted by paddles 242 prior to reaching vapor outlets 62, 64, and 170. This action causes the droplets to strike paddles 262 and be back driven by centrifugal force into chamber 20 and thus virtually eliminating contamination of distillate by distilland droplets.

The lubricant for the rotors consists of condensate stream 172 that enters housing 22 at 174 into manifold 176 where it is distributed to each rotor through tubes 178, which are connected to bracket 46. The stream then goes into manifold 180 where it enters orifices 182 in shaft 32 to supply lubricant to bearings 34 and thrust bearings 48 and 66.

Referring to FIGS. 2 and 3, the bearing inserts 90 are lubricated by stream 106. This stream enters housing 22 at 110 into manifold 184 where it enters brackets 92 through tubes 186 and then through internal passages that communicate between tube 186 and the space between inserts 90 and drive shafts 76, 78, and 80.

The noncondensible gases are withdrawn from each of the effects at 188 into tubes 190, into vacuum manifold 192, and into a vacuum pump 194.

Figure 11:
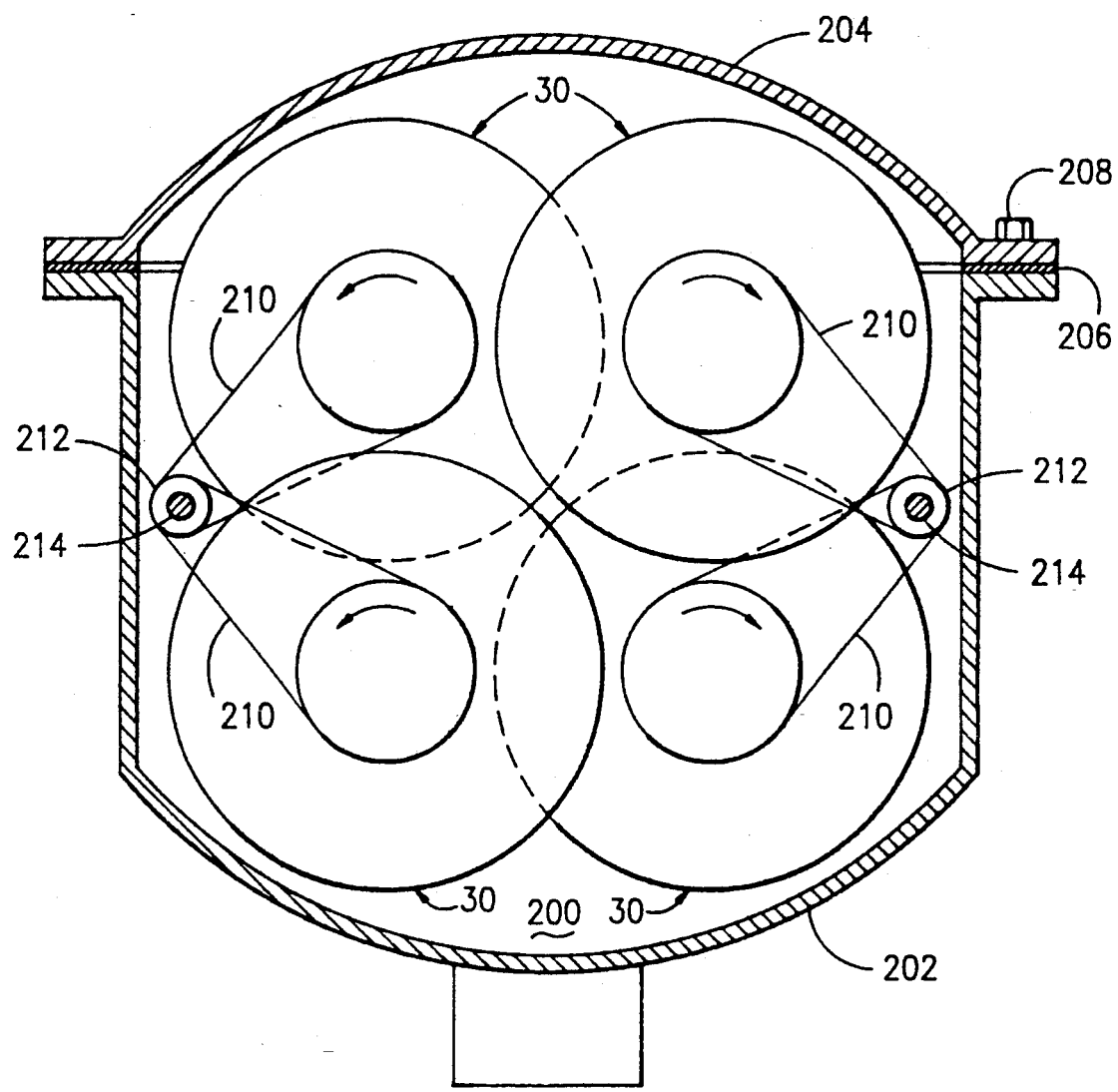
FIG. 11 shows multiple rotors in each effect of the module.

In order to pack large heat transfer area in the module, several rotors can be installed in each effect. FIG. 11 illustrates an arrangement in which four rotor assemblies can be installed in each effect to quadruple the amount of heat transfer area in the module. This arrangement consists of a tight enclosure defining separate chambers 200. The enclosure consists of a housing 202 and a cover 204 secured together with a gasket 206 and bolts 208 and includes within each chamber 200 four rotor assemblies 30 installed therein. The rotors are driven by pulleys 212 through belts 210. Pulleys 212 are driven by shafts 214 in each effect in a similar manner to that for a single rotor as shown in FIG. 2 and 3. For clarity, Feed distribution, wipers, intereffect feeds, distillate collection, rotor and drive shaft lubrication connections, and vacuum system are not shown. They would be arranged in a similar fashion to those shown in FIGS. 1 to 8. By simple arrangement of shafts 214 and belts 210, the number of rotors in each effect can increased by steps of four to correspond to the number required for the application. For example, eight rotors can be installed in each effect by simply stacking four more rotors above the four rotors shown in FIG. 11. The additional four rotors would be driven in a similar manner to the four rotors shown in FIG. 11.

Figure 12:
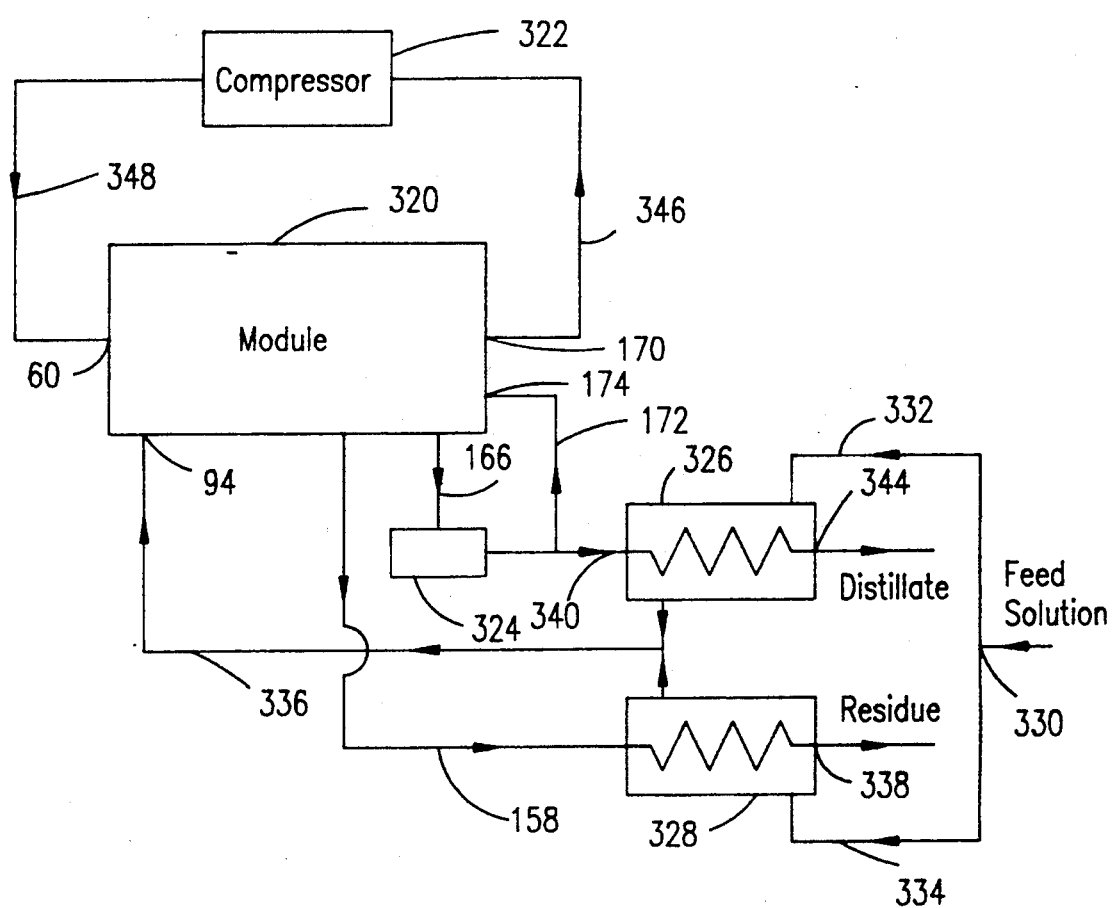
FIG. 12 shows schematic flow diagram where the module is used in mechanically driven multieffect vapor compression mode.

The use of the module in multieffect vapor compression distillation system is shown schematically in FIG. 12. The system consists of a module 320, compressor 322, distillate pump 324, condensate heat exchanger 326, and residue heat exchanger 328 and standard items.

For clarity, the standard items such as (e.g. motors, valves, level control, temperature control, filters, etc.) are not shown.

In operation the feed solution enters the system at 330 where it is split into two streams 332 and 334. Stream 332 is heated in exchanger 326 to cool condensate (distillate) stream 340 and stream 334 is heated in exchanger 328 to cool residue stream 158 (FIG. 1). The two streams 332 and 334 emerge from exchangers 326 and 328 and join together to form stream 336 that enters the first effect of the module at 94 (FIG. 1). The residue 158 from the last effect is cooled in exchanger 328 to heat stream 334 and is then discharged as residue at 338. The vapor generated in the last effect of the module leaves the module at 170 (FIG. 1) as stream 346 and enters the compressor 322 to raise its saturation pressure and temperature. The pressurized vapor then leaves the compressor through tube 348 and enters the first effect of the module at 60 (FIG. 1) where it is used as the heating vapor in the module. The distillate stream from manifold 166 (FIGS. 2 and 3) is withdrawn by pump 324 where it is split into two streams 172 and 340. Stream 172 is returned to the module at 174 (FIG. 3) to be used as rotor lubricant. Stream 340 enters exchanger 326 to be cooled by heating stream 332 and is then taken out as distillate at 344.

Figure 13:
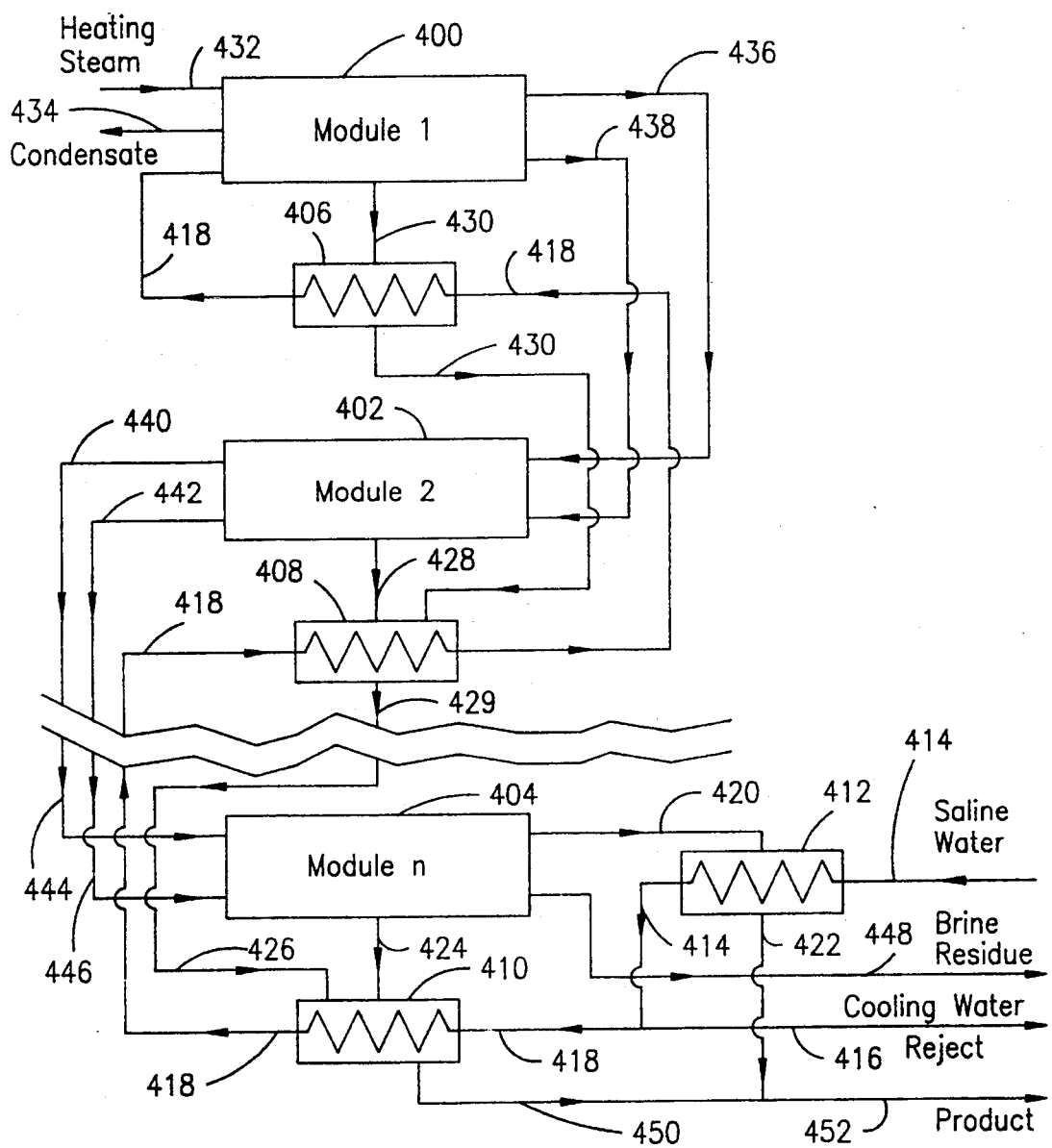
FIG. 13 shows schematic flow diagram where the modules are used in thermally driven multieffect distillation mode.

The use of the module in thermally driven multieffect distillation is shown schematically in FIG. 13. The system consists of n modules; 400, 402, and 404 each with a heat exchanger 406, 408, and 410, and a final condenser 412 with connecting piping. For clarity, the items described earlier that are shown in FIG. 2 and 3, such as the lubrication system, the vacuum system, pumps, valves, etc. are not shown here. As an example, the operation of the system will be shown in the production of distilled water from saline water.

In operation, saline water stream 414 is used as cooling water in condenser 412 to condense the vapor, stream 420, generated in the last effect of module n into condensate stream 422. Upon leaving condenser 412, stream 414 is split into streams 416 and 418. Stream 416 is rejected while stream 418 is heated in exchanger 410 by cooling streams 424 and 426. Heated stream 418 is further heated in the exchangers connected to modules n-1 through module 3 and then enters exchanger 408 to cool streams 428 and 430. Upon leaving exchanger 408 stream 418 enters exchanger 406 to cool stream 430 and then enters the first effect of module 1 to be used as feed to the system.

Heating steam 432, from an external source, enters the first effect of module 1 where it condenses and returns as stream 434 to the external source. Part of stream 418 evaporates in module 1 and the balance leaves as stream 438 and enters module 2. The vapor generated in the last effect of module 1, stream 436, is used as the heating vapor in module 2. The condensate formed in the other effects of module 1 is collected as stream 430 which is then cooled in exchanger 406 prior to entering exchanger 408. In module 2 part of stream 438 is evaporated and the balance leaves the module as stream 442. Stream 436 enters the first effect of module 2 to repeat the process that occurred in module 1 except that the condensate resulting from stream 436 joins with the condensate from the other effects of module 2 to form stream 428. The vapor generated in the last effect of module 2 leaves the module as stream 440. Streams 428 and 430 are cooled in exchanger 408 by heating stream 418 and leave as stream 429. This process is repeated in modules 3 through n-1 where the vapor generated in the last effect of module n-1 enters the first effect of module n as stream 444 and the unevaporated portion of the feed from module n-1 enters the first effect of module n as stream 446. The unevaporated portion of stream 446 leaves the last effect of module n as stream 448 and is rejected as residue (brine). The condensate stream 424 formed in module n together with stream 426 from the heat exchanger connected to module n-1 are cooled in exchanger 310 and leave as stream 450. Streams 450 and 422 are joined together and leave the system as product, stream 452.

In the recovery of distilled water from saline water, gray water, or toxic water solutions, the energy required to drive the process is a function of the temperature difference across the heat transfer surface in the evaporator and the concentration of the saline solution. For a given temperature difference, the concentration of the solution affects energy requirement; the higher the concentration the higher the energy required. For example, in single effect vapor compression distillation of saline water, the isentropic work, Wk, required by the compressor is given by:

$$Wk = h(Dt + \alpha)/T$$

where
h = Latent heat of evaporation of water
T = Absolute temperature of the evaporating brine
Dt = Temperature difference across the heat transfer surface
α = Boiling point elevation of the brine solution.

For a given Dt and T the work (energy) required by the compressor can be decreased by reducing the boiling elevation. This requires that the brine concentration be reduced which means that the fraction of the saline water feed recovered as distilled water is also reduced. This may be acceptable at locations where saline water is plentiful and brine disposal does not present a problem. However, at inland locations where high water recovery is desired and brine disposal presents difficulty, the concentration of the discharged brine must be kept as high as possible to reduce brine disposal. This fact increases the energy required by the compressor accordingly. A case in point is the disposal of agricultural drainage water in the San Joaquin Valley, California. The farmers in the valley dumped their drainage water in the San Luis canal which drained in Kesterson Reservoir. The accumulation of selenium, leached from the soil in the farms, caused disfigurement of migratory birds which led to the shut down of the San Luis Drain and the closing of Kesterson reservoir. The California Department of Water Resources undertook a program to recover as much as 95 percent of the drainage water for reuse and use the concentrated brine in salt gradient solar ponds. Vapor compression distillation was one of the methods tested at Los Banos, California, for reclaiming about 95 percent of the drainage water for reuse. The average salt concentration in the drainage water was about one percent. For a recovery of 95 percent and evaporation temperature of 140 F., the concentration of the evaporating solution is estimated at about 20 percent. The value of the boiling point elevation at these conditions is estimated to be 6.16 F. For a temperature difference of 3 F, the isentropic work required to compress one pound of vapor is about 15.9 Btu. This value represents the minimum amount of mechanical energy required to produce one pound of product water. In a five effect vapor compression system, the isentropic work required to compress one pound of vapor is given by:

$$Wk_5 = h(Dt_1 + a_1 + Dt_2 + a_2 + Dt_3 + a_3 + Dt_4 + a_4 + Dt_5 + a_5)/T$$

where $Dt_n$ = Temperature difference across the heat transfer surface in effect n for n=1 to 5

$a_n$ = Boiling point elevation in effect n for n=1 to 5

Because brine concentration increases in each effect, the boiling point elevation is lowest in effect 1 and highest in effect 5. For $Dt_n = 3$ F, exit brine concentration of 20 percent, and average evaporation temperature of 140 F, the value of $a$ in each effect is estimated as follows:

$a_1 = 0.25$ F; $a_2 = 0.33$ F; $a_3 = 0.48$ F; $a_4 = 0.91$ F; $a_5 = 6.16$ F

The isentropic work required to compress one pound of vapor is estimated to be 40.1 Btu. However, for each pound of vapor compressed the system produces about 5 pounds of product water. Therefore, the work required per pound of product water is about 8.0 Btu. Comparing this value to 15.9 Btu per pound of product water from the conventional single effect vapor compression shows that energy requirement is reduced by about a factor of 2 by the use of 5 effect instead of a single effect. It should be noted here that this advantage becomes more pronounced when Dt decreases. This is significant in the use of this invention as Dt of 1 F and lower has been used in an experimental 5 effect module embodying the invention. The use of 1 F instead of 3 F for the example shown earlier results in reduction of isentropic work required from about 12.4 Btu for a single effect to about 4.6 Btu per pound of product. This is a saving in energy of about 63 percent, a very significant improvement over existing art.

The use of this invention in thermally driven multieffect distillation also results in energy and capital savings by using small Dt per effect. For given values of heat source and heat sink temperatures the use of small Dt increases the number of effects and results in an increase of product output per unit of energy supplied by the heat source. Also, the use of small Dt decreases the total water requirement per unit of product and thus reduces the cost of cooling water supply system and decreases the energy required to pump this water. For example, the desalting of sea water using conventional multieffect equipment requires Dt of about 10 F per effect. The use of this invention decreases Dt to 3 F or lower resulting in more than three times as many effects thus increasing the productivity per unit of energy input by a least a factor of 3. Also, because more of the cooling water outlet from the final condenser (FIG. 13) is used as feed, less water is rejected and, thus, results in net saving of feed water to the system per unit of product.

A useful advantage of this invention is that leakage from the distilland to the distillate will not occur because the distillate is at higher pressure than the distilland due to the centrifugal force imposed on the rotating condensate pool, thus any leakage will be in the opposite direction eliminating distillate contamination by the distilland. Still another advantage of this invention is that the bearings surfaces between the stationary shaft and the couplings in the rotors are lubricated by the distillate which then drains into the rotating condensate pools thus eliminating the need for external lubricant which can cause contamination of the distillate. Still another advantage is that the drive shafts are lubricated by the distilland which drains into the bottom and joins the distilland pool.

This module invention is particularly useful in the concentration of aqueous solutions to reduce the volume of residue. In an experiment using clothes and dish washing machine waste waters as the feed it was possible to recover more than 99 percent of the waste water as distilled water and thus reduce the volume of the residue by a factor of 100. This fact is crucial in future Lunar and Martian missions where water is not available and must be reused to reduce residue and minimize the cost of resupply from earth. This invention is particularly useful in such missions because it creates its own gravity due to disk rotation as compared to conventional static evaporators which need gravity for their operation. Volume reduction of residue is also very important in the chemical industry such as metal plating, photographic shops, and other places where the recovery of water and valuable metals from the spent solutions are important to reduce water requirement, recover valuable metals, and reduce waste. I do not, however, limit the use of my inventions to these substances, and contemplate its use for other liquids and dissolved mixtures.

It is obvious that variations within the skill of the art may be made in the module without altering the essence of the invention. While the illustrations show details of preferred embodiments, it is to be understood that such disclosure is intended as illustrative, rather than limiting.

I claim:

1. A rotating evaporator device, including; an enclosure defining at least one sealed chamber;
   at least one rotor assembly disposed within said sealed chamber;
   means for securing said rotor assembly rotating on a stationary shaft in said sealed chamber;
   means disposed within said sealed chamber for driving said rotor assembly;
   said rotor assembly including a first evaporator surface, and means for applying a thin film of distilland to said first evaporator surface to generate a first heating vapor;
   said rotor assembly including a second condenser surface, means for exposing said second condenser surface to a second heating vapor, and means for collecting condensed distillate from said second condenser surface.

2. The rotating evaporator device of claim 1 wherein said rotor assembly includes pairs of disks disposed in spaced apart, parallel relationship, said disks including outer circumferential edges and inner circumferential edges, means for joining said outer circumferential edges of said pairs of disks, coupling means for joining said pairs of disks at said internal circumferential edges of said pairs of disks to define interior rotor chambers, means for mounting said pairs of disks on said stationary shaft, said stationary shaft including a passage extending axially therein and ports to permit passage of said second heating vapor into said interior chambers.

3. The rotating evaporator device of claim 2, wherein said means for driving said rotor assembly includes pulley coupling means secured to one end of said pairs of disks, said pulley coupling connected to rotate said pairs of disks about said stationary shaft, drive shaft means extending into said sealed chamber, and pulley means for transferring rotational motion from said drive shaft means to said pulley coupling means and said pairs of disks.

4. The rotating evaporator device of claim 3, further including bearing insert means disposed between said stationary shaft and said couplings for permitting free rotational motion of said pairs of disks.

5. The rotating evaporator device of claim 4, further including lubricating means for lubricating said bearing insert means with said distillate.

6. The rotating evaporator device of claim 2, wherein said second condenser surface comprises the interior surfaces of said pairs of rotor disks, and further including scoop means for collecting distillate from peripheral portions of said interior rotor chambers and transferring said distillate out of said rotor assembly.

7. The rotating evaporator device of claim 2, wherein said first evaporator surface comprises the exterior surfaces of said pairs of rotor disks, and said means for applying a thin film comprises wiper means disposed in said sealed chamber.

8. The rotating evaporator device of claim 7, wherein said wiper means includes a wiper assembly, said wiper assembly including a flexible wiper blade disposed to impinge on said exterior surfaces of said pairs of rotor disks, and means for delivering distilland to said wiper blade whereby said wiper blade flexes in the direction of rotation of said disks to apply a thin film of distilland to uniformly cover said exterior surfaces of said pairs of rotor disks.

9. The rotating evaporator device of claim 8, wherein said means for delivering distilland to said wiper blade includes a wiper blade holder having a distilland channel extending therein, and slots formed in said wiper blade holder for directing flow of said distilland from said distilland channel to said exterior surfaces of said rotor disks.

10. The rotating evaporator device of claim 2, further including rotary demister means for removing distilland droplets from said first heating vapor as said first heating vapor is delivered through a discharge port from said sealed chamber.

11. The rotating evaporator device of claim 10, wherein said rotary demister means includes a circular plate and a plurality of paddles extending from said circular plate, means for rotating said circular plate at the input of said discharge port, whereby said paddles strike said distilland droplets and drive said droplets back into said sealed chamber.

12. The rotating evaporator device of claim 11, wherein said means for rotating said circular plate comprises said means for driving said rotor assembly.

13. The rotating evaporator device of claim 1, further including a plurality of rotor assemblies in each said sealed chamber, each disposed for rotation about its own said stationary shaft.

14. The rotating evaporator device of claim 13, wherein said plurality of rotor assemblies in said sealed chamber comprises a first effect, further including plurality of said effects, each in its own said sealed chamber, and means for operatively connecting said plurality of said effects to form a module for distillation or concentration of liquids.

15. The rotating evaporator device of claim 14, wherein said means for operatively connecting said plurality of modules includes means for connecting said effects in said modules in a serial flow chain having a first effect and a last effect, with said first heating vapor of an effect being delivered as said second heating vapor of an adjacent effect in said serial flow chain.

16. The rotating evaporator device of claim 15, further including vapor compressor means for compressing and heating said first heating vapor of the last effect in said serial flow chain and delivering the compressed and heated first heating vapor to become said second heating vapor of the first effect in said serial flow chain.

17. The rotating evaporator device of claim 15, further including means to provide said second heating vapor to the first effect in said first module, and means to condense said first heating vapor from the last effect in said last module in said serial flow chain.

18. The rotating evaporator device of claim 15, wherein each of said modules includes a distilland pool operatively associated with each sealed chamber of each adjacent module, and further including means for serially interconnecting said distilland pools of each of said effect modules in said serial flow chain.

19. The rotating evaporator device of claim 15, wherein said drive shaft means includes a drive shaft supported by a plurality of drive shaft bearing inserts.

20. The rotating evaporator device of claim 19 further including means for lubricating said drive shaft bearing inserts by delivering a stream of said distilland to said drive shaft bearing inserts.

21. The rotating evaporator device of claim 19, further including a plurality of said drive shafts, and flexible coupling means for joining said plurality of said drive shafts in rotary drive relationship.

22. The rotating evaporator device of claim 6, further including a plurality of rotor assemblies in said sealed chamber, and distillate manifold means for collecting said distillate from said scoop means of said plurality of rotor assemblies.

23. The rotating evaporator device of claim 14, further including distillate manifold means for collecting distillate from said plurality of rotor assemblies, and liquid seal means to prevent vapor flow between said plurality of effects, said liquid seal means including a liquid head maintained in said distillate manifold means.

* * * * *